US011241997B2

(12) United States Patent
Egbert, II et al.

(10) Patent No.: US 11,241,997 B2
(45) Date of Patent: Feb. 8, 2022

(54) ROOF RACK LIGHTING SYSTEM FOR A VEHICLE

(71) Applicant: American Honda Motor Co., Inc., Torrance, CA (US)

(72) Inventors: Stanley Robert Egbert, II, Anna, OH (US); Colin P. Gorey, Marysville, OH (US); Brian K. Violet, Jr., Mechanicsburg, OH (US)

(73) Assignee: AMERICAN HONDA MOTOR CO., INC., Torrance, CA (US)

( * ) Notice: Subject to any disclaimer, the term of this patent is extended or adjusted under 35 U.S.C. 154(b) by 107 days.

(21) Appl. No.: 16/689,618

(22) Filed: Nov. 20, 2019

(65) Prior Publication Data

US 2021/0146824 A1 May 20, 2021

(51) Int. Cl.
*B60Q 1/24* (2006.01)
*B60Q 1/26* (2006.01)
*B60R 9/045* (2006.01)

(52) U.S. Cl.
CPC ............ *B60Q 1/2611* (2013.01); *B60Q 1/24* (2013.01); *B60Q 1/2661* (2013.01); *B60R 9/045* (2013.01)

(58) Field of Classification Search
CPC ...... B60Q 1/2611; B60Q 1/2661; B60Q 1/24; F21V 21/30; F21V 19/045
See application file for complete search history.

(56) References Cited

U.S. PATENT DOCUMENTS

| 3,487,360 | A | * | 12/1969 | Thompson | B60Q 1/2657 340/472 |
| 5,743,635 | A | * | 4/1998 | Hulse | B60Q 1/2657 362/385 |
| 7,419,286 | B2 | * | 9/2008 | Stein | B60Q 1/2611 224/329 |
| 8,414,168 | B2 | | 4/2013 | Jutila et al. | |
| 9,758,088 | B1 | | 9/2017 | Salter et al. | |
| 9,975,470 | B2 | | 5/2018 | Kozole et al. | |
| 9,975,473 | B2 | | 5/2018 | Wittorf | |
| 10,118,538 | B2 | | 11/2018 | Salter et al. | |
| 2008/0191626 | A1 | | 8/2008 | Salter et al. | |
| 2012/0074841 | A1 | | 3/2012 | Liu et al. | |
| 2016/0052445 | A1 | | 2/2016 | Huang | |
| 2017/0334344 | A1 | | 11/2017 | Salter et al. | |
| 2018/0149344 | A1 | * | 5/2018 | Cornell | F21V 17/007 |
| 2018/0229646 | A1 | * | 8/2018 | Van Buren | F21V 21/30 |

FOREIGN PATENT DOCUMENTS

| CN | 201580868 U | 9/2010 |
| WO | 2016055467 A1 | 4/2016 |
| WO | 2018227858 A1 | 12/2018 |

* cited by examiner

*Primary Examiner* — Julie A Bannan
(74) *Attorney, Agent, or Firm* — Armstrong Teasdale LLP (57) ABSTRACT

A roof rack lighting assembly for a vehicle includes a base member configured to secure to the vehicle. The roof rack lighting assembly also includes a slider member slidably coupled to the base member and selectively moveable between a first slider position and a second slider position. A light assembly is pivotally coupled to the slider member and selectively moveable between a first light position and a second light position.

20 Claims, 6 Drawing Sheets

ROOF RACK LIGHTING SYSTEM FOR A VEHICLE

BACKGROUND

The field of the disclosure relates generally to a roof rack lighting system for a vehicle and, more specifically, to a roof rack lighting system that selectively illuminates the roof area of the vehicle and a selected area adjacent to the vehicle.

At least some known vehicles, such as sport utility vehicles (SUVs), minivans, and station wagons include integrated roof rail systems designed to hold, carry, or otherwise accommodate luggage, sporting equipment, boxes, and the like. Some known roof rail systems include a pair of parallel rails coupled to the roof panel of the vehicle such that the rails extend along the driver and passenger sides of the vehicle. In some situations, a user may be either coupling or removing an item to or from the roof rail system in low light conditions. In other situations, such as in emergency conditions, a user may desire an area adjacent to the vehicle to be illuminated. Accordingly, a need exists to provide a user with a light source that may selectively illuminate the roof area and/or illuminate an area adjacent to the vehicle.

BRIEF DESCRIPTION

One aspect of the present disclosure includes a roof rack lighting assembly for a vehicle. The roof rack lighting assembly includes a base member configured to secure to the vehicle. The roof rack lighting assembly also includes a slider member slidably coupled to the base member and selectively moveable between a first slider position and a second slider position. A light assembly is pivotally coupled to the slider member and selectively moveable between a first light position and a second light position.

Another aspect of the present disclosure includes a vehicle. The vehicle includes a roof including a roof panel and a pair of roof rails. The vehicle also includes roof rack lighting assembly coupled to at least one of the pair of roof rails. The roof rack lighting assembly includes a base member fixedly secured to the vehicle and a slider member slidably coupled to the base member. The slider member is selectively moveable between a first slider position and a second slider position. The roof rack lighting assembly also includes a light assembly pivotally coupled to the slider member and selectively moveable between a first light position and a second light position.

Yet another aspect of the present disclosure includes a method of operating a roof rack lighting system of a vehicle. The method includes sliding a slider member with respect to a base member between a first slider position and a second slider position. The method also includes rotating a light assembly with respect to the slider member between a first light position and a second position. The method further includes operating a light source of the light assembly to illuminate a roof area of the vehicle when the light assembly is in the first light position, and operating the light source of the light assembly to illuminate an area adjacent the vehicle when the light assembly is in the second light position.

The features, functions, and advantages that have been discussed can be achieved independently in various embodiments or may be combined in yet other embodiments further details of which can be seen with reference to the following description and drawings.

DETAILED DESCRIPTION

Embodiments of the assembly described herein include a roof rack lighting assembly for a vehicle. In the exemplary embodiment, the assemblies each include a base member that couples to a roof rail of the vehicle. The roof rack lighting assemblies also includes a slider member that is slidably coupled to the base member such that the slider member is selectively linearly moveable between a first slider position and a second slider position. A light assembly is pivotally coupled to the slider member such that the light assembly is moveable between a first light position and a second light position. When in the first light position, the light assembly illuminates the roof area of the vehicle to assist with attaching or removing an item to or from the roof rack. When in the second light position, the light assembly selectively illuminates an exterior area adjacent to the vehicle for additional light during roadside assistance or for other activities, such as, but not limited to camping.

Figure 1:
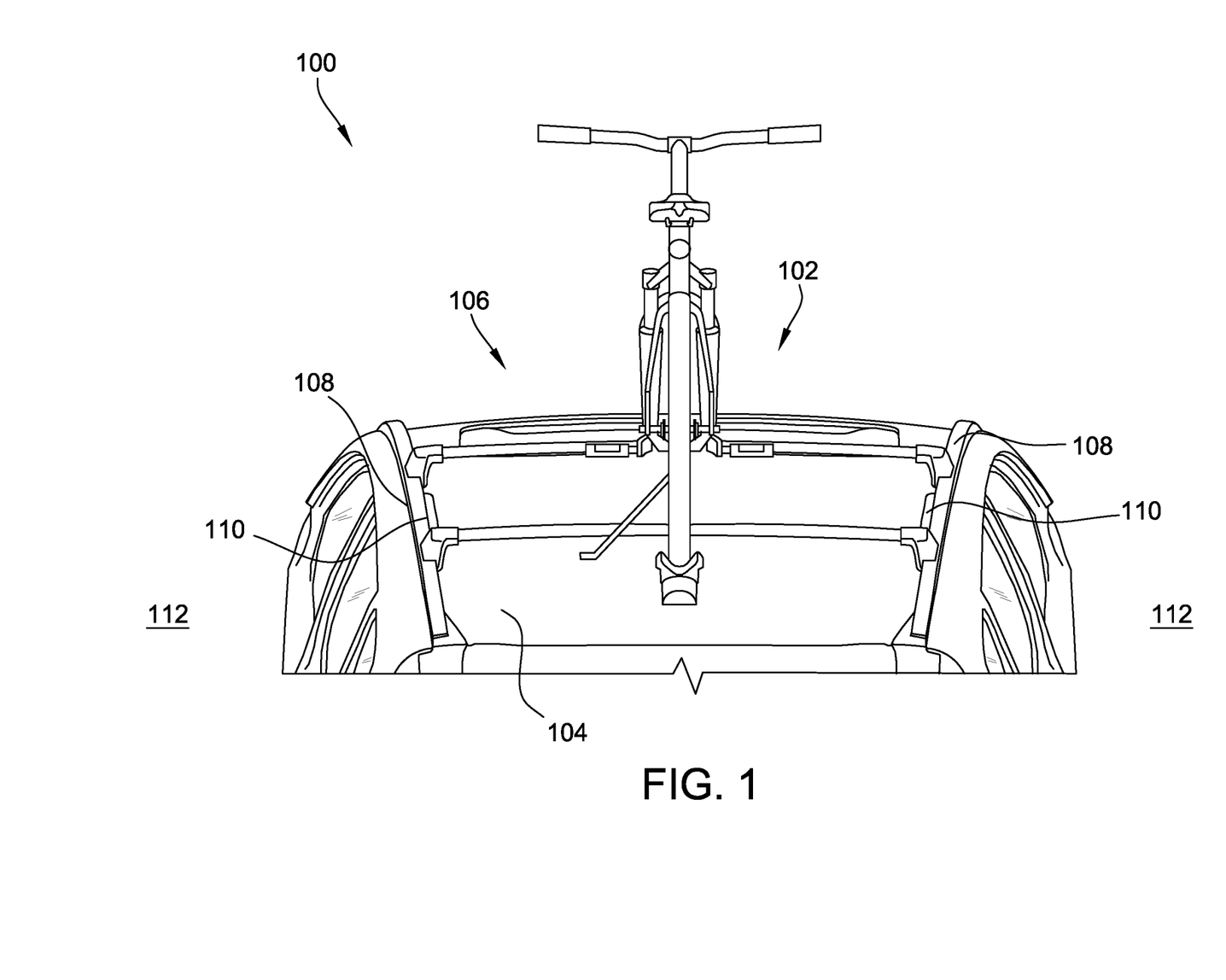
FIG. 1 is a perspective view of a roof area of an exemplary vehicle including an exemplary roof rack lighting assembly.

FIG. 1 is a perspective view of a vehicle 100 having a roof area 102. As used herein, the term "vehicle" may include, but is not limited to only including cars, trucks, vans, minivans, or SUVs. Roof area 102 includes a roof panel 104 and a roof rack 106 that includes a pair of longitudinally-extending roof rails 108 that are each coupled to roof panel 104. A roof rack lighting assembly 110 is coupled to each roof rail 108 and is configured to selectively illuminate either roof area 102 or an area 112 exterior to and adjacent to vehicle 100.

Figure 2:
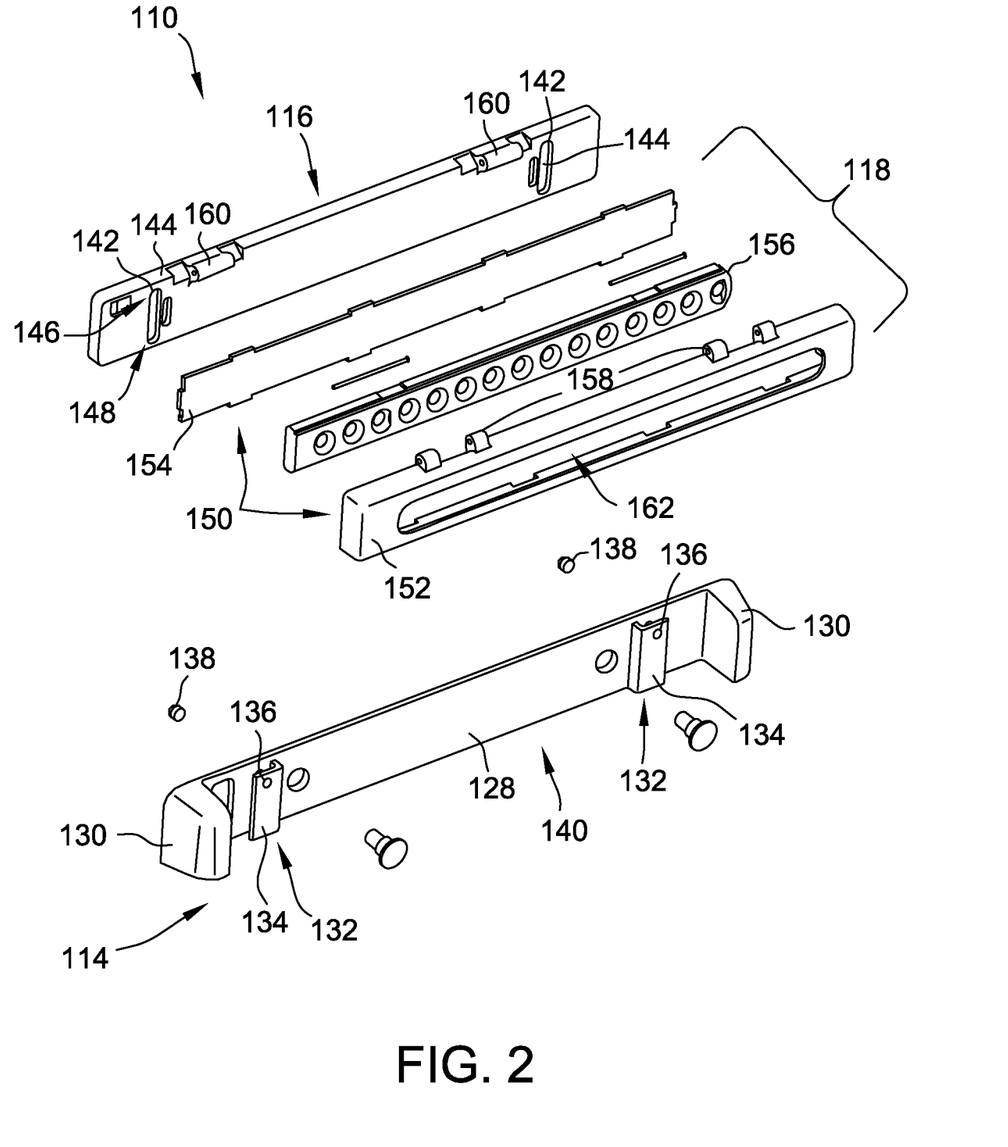
FIG. 2 is an exploded view of the roof rack lighting assembly shown in FIG. 1.
Figure 3:
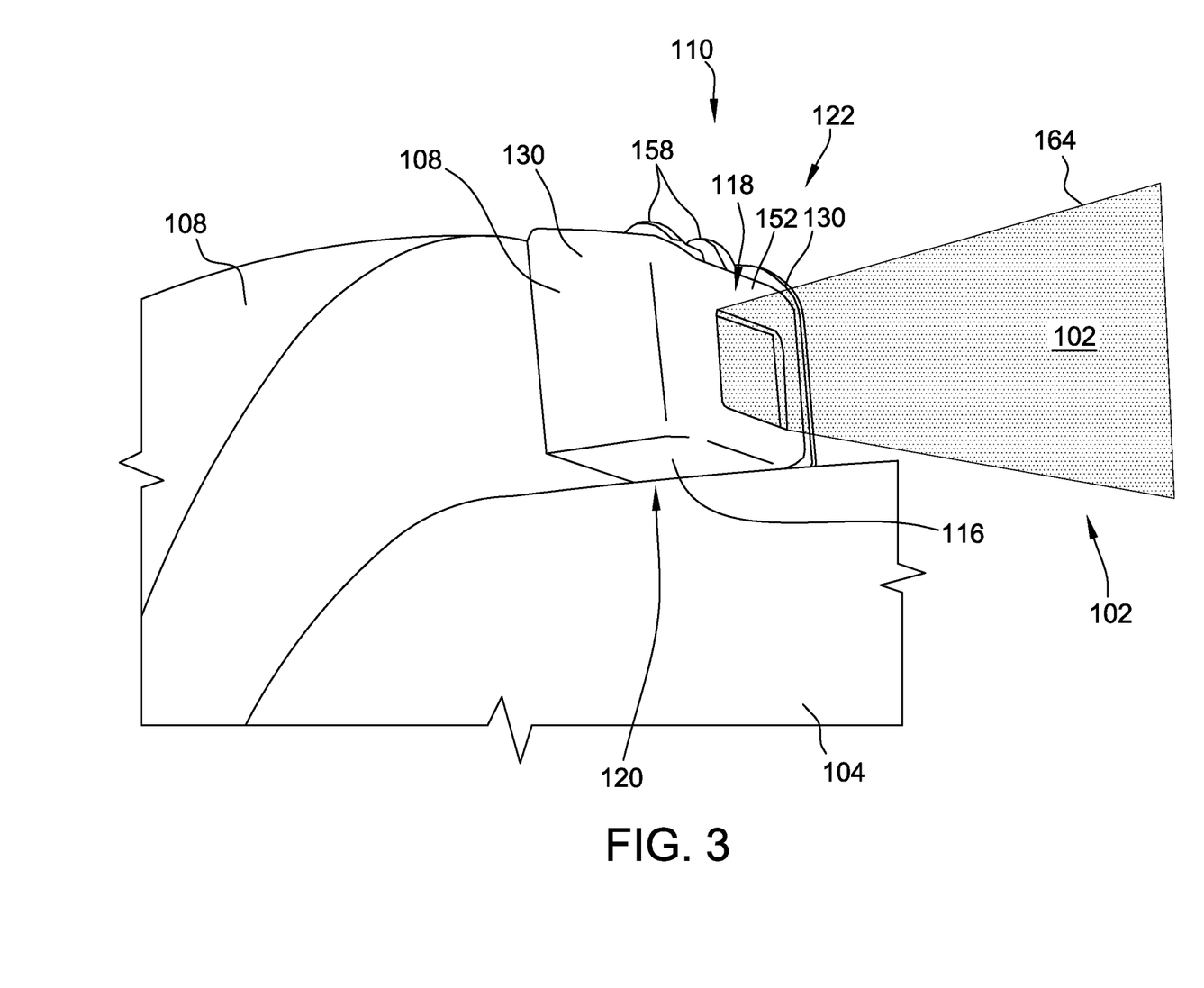
FIG. 3 is a perspective view of the roof rack lighting assembly shown in FIGS. 1 and 2 and including an exemplary slider member and a light assembly in a first position.
Figure 4:
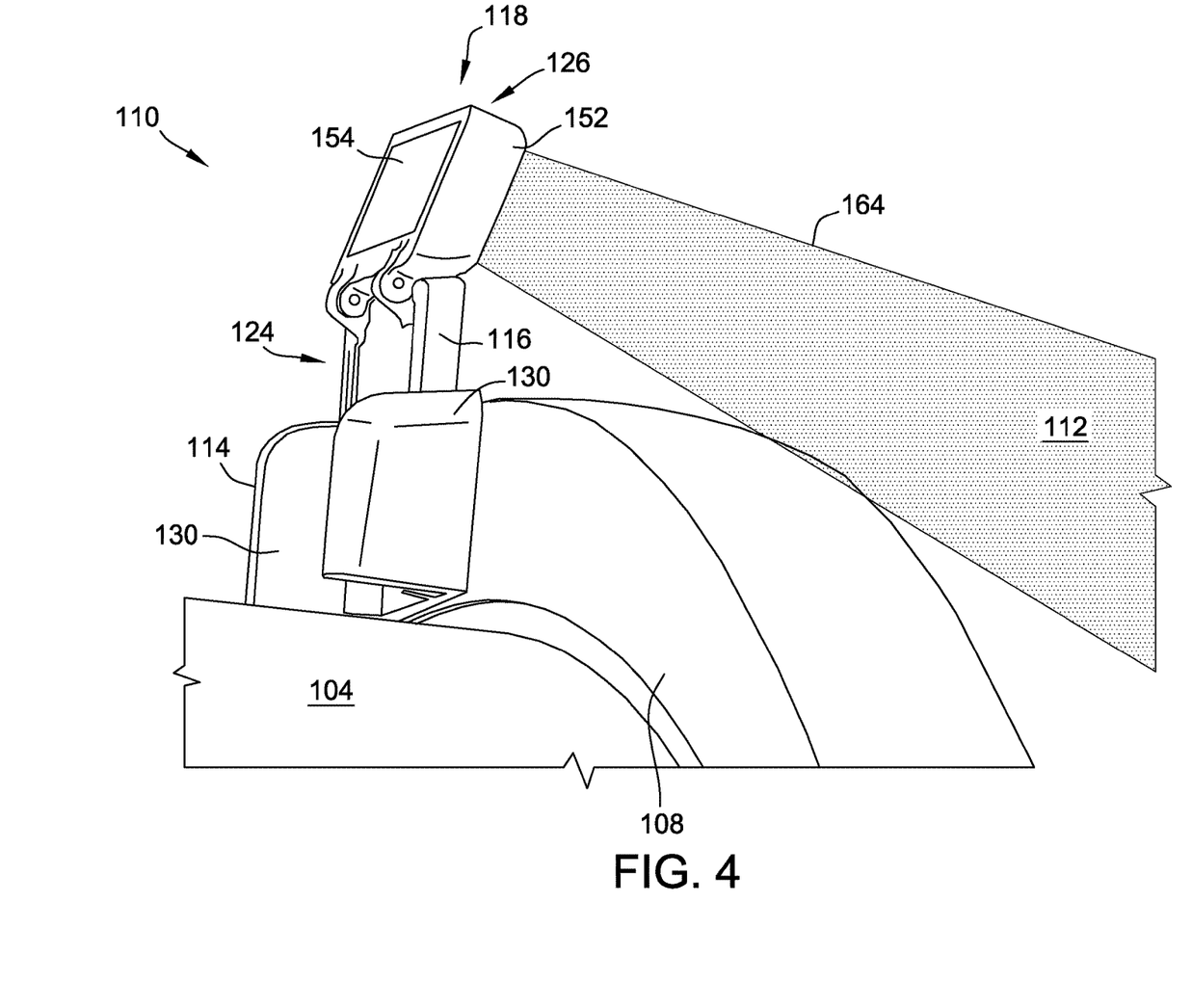
FIG. 4 is a perspective view of the roof rack lighting assembly shown in FIG. 3 and including the slider member and light assembly in a second position.

FIG. 2 is an exploded view of roof rack lighting assembly 110. In the exemplary embodiment, assembly 110 includes a base member 114, a slider member 116, and a light assembly 118. FIG. 3 is a perspective view of roof rack lighting assembly 110 and illustrates slider member 116 in a first slider position 120 and light assembly 118 in a first light position 122. Similarly, FIG. 4 is a perspective view of roof rack lighting assembly 110 and illustrates slider member 116 in a second slider position 124 and light assembly 118 in a second light position 126. In one embodiment, a user manually transitions lighting assembly 110 from the first slider position 120 and first light position 122 to the second slider position 124 and second light position 126. In an alternative embodiment, the transition of lighting assembly 110 from the first slider position 120 and first light position 122 to the second slider position 124 and second light position 126 may be motorized or automatically performed in other ways.

In the exemplary embodiment, base member 114 includes a base wall 128 and a pair of sidewalls 130 that extend outwardly from base wall 128 at opposing ends thereof. Base member 114 is fixedly secured to roof rail 108 such that base member 114 remains stationary and in a fixed position with respect to roof rail 108. Base member 114 also includes a pair of engaging members 132 that enable selective movement and repositioning of slider member 116 with respect to base member 114, as described herein. In one embodiment, each engaging member 132 includes a tab 134 formed with an opening 136 sized to receive a fastener or a pin 138 therethrough. In other embodiments, engaging members 132 include any other structure that enables base member 114 and slider member 116 to operate as described herein.

In the exemplary embodiment, slider member 116 is slidably coupled to base member 114 such that slider member 116 is selectively linearly moveable with respect to base member 114 between the first slider position 120 and the second slider position 124. More specifically, in the first slider position 120, as shown in FIG. 3, slider member 116 is positioned within a cavity 140 defined between sidewalls 130 of base member 114 such that slider member 116 and base wall 128 are in a face-to-face relationship. In the second position 124, as shown in FIG. 4, slider member 116 slides upwards, away from roof panel 104 and base member 114, such that slider member 116 is no longer positioned within cavity 140. In one embodiment, slider member 116 slides a distance of between approximately 15 millimeters (mm) (0.59 inches) to approximately 40 mm (1.57 inches). More specifically, in the exemplary embodiment, slider member 116 slides approximately 20 mm (0.79 inches) from the first slider position 120 to the second slider position 124.

Figure 5:
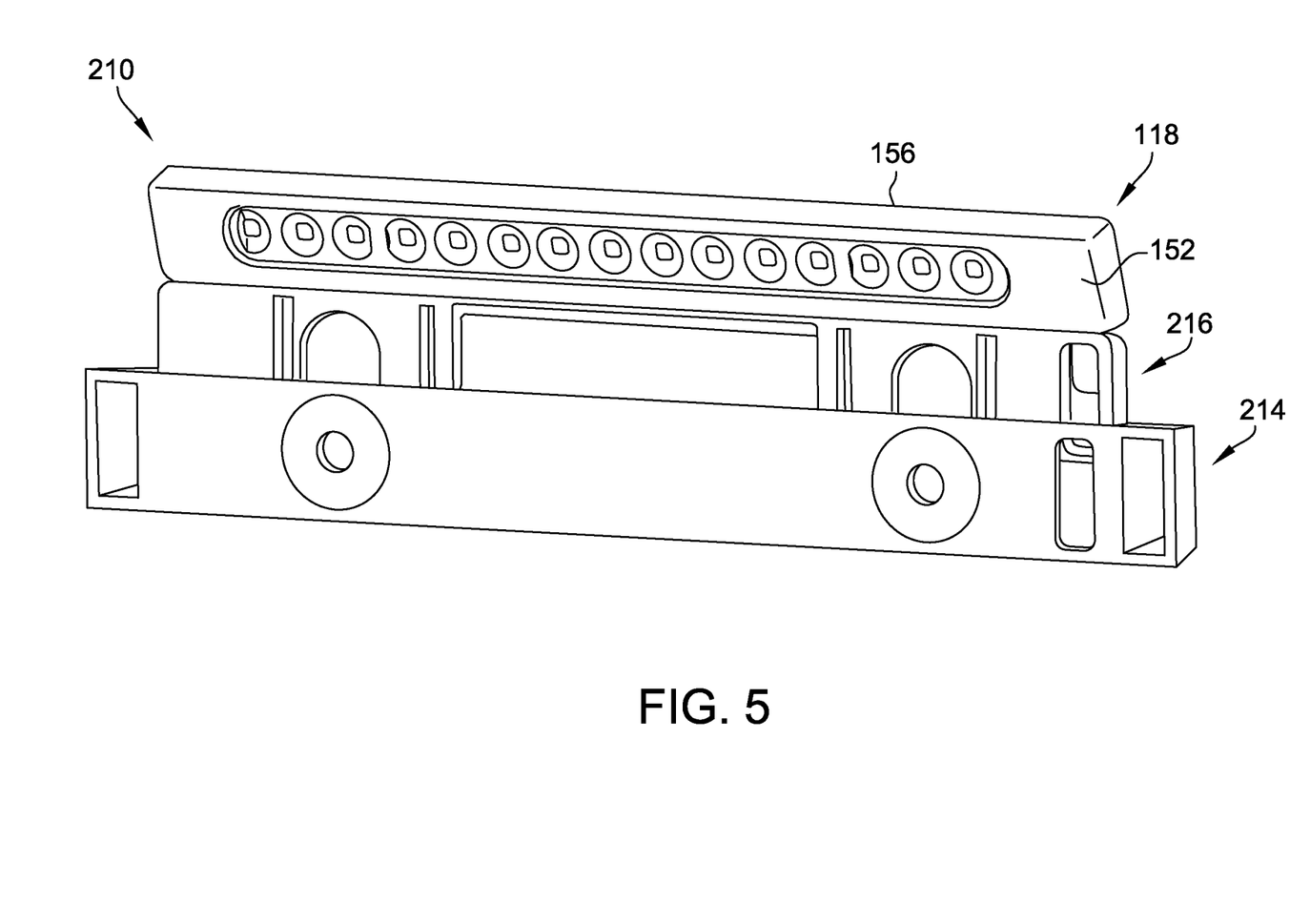
FIG. 5 is an outer perspective view of an alternative roof rack lighting assembly illustrating a slider member and a light assembly in a second position.

In the exemplary embodiment, slider member 116 includes a pair of receiving members 142 that cooperate with engaging members 132 of base member 114 to facilitate linear movement of slider member 116 with respect to base member 114. In one embodiment, receiving members 142 include a slot 144 defined therein that is sized to receive pin 138 therein. In operation, pin 138 remains in a fixed position and slider member 116 transitions along pin 138 to change the position of pin relative to slot 144. Specifically, when in the first slider position 120, pin 138 is at a top end 146 of slot 144 and is furthest from roof panel 104. Similarly, when in the second slider position 124, pin 138 is at a bottom end 148 of slot 144. In another embodiment, as shown in FIG. 5, receiving members 142 are grooves located on a rear surface of slider member 116 that receive tabs 134 of base member 114. In another embodiment, receiving members 142 may include any other structure that cooperates with engaging members 132 to enable slider member 116 to move with respect to base member 114 and to operate as described herein.

In the exemplary embodiment, light assembly 118 is pivotally coupled to slider member 116 such that light assembly 118 is rotatably and selectively moveable with respect to slider member 116 between the first light position 122 and the second light position 126. As described herein, when in the first light position, light assembly 118 illuminates roof area 102 of vehicle 100, and, when in the second light position 126, light assembly 118 illuminates an area 112 exterior to and adjacent to vehicle 100. In the exemplary embodiment, light assembly 118 includes a frame 150 including a front frame panel 152 and a rear frame panel 154. Light assembly 118 also includes a light source 156 positioned with frame 150 between panels 152 and 154. Frame 150 further includes an opening or panel 162 that enables light from light source 156 to escape from light assembly 118.

In the exemplary embodiment, frame 150 includes a first hinge portion 158 that engages with or that is coupled to a second hinge portion 160 on slider member 116 to enable light assembly 118 to rotate with respect to slider member 116. When light assembly 118 is in the first light position 122, rear frame panel 154 is in a face-to-face relationship with slider member 116 such that front frame panel 152 faces inwardly towards roof area 102. Light source 156 emits light 164, that is directed through front frame panel 152 to illuminate roof area 102 of vehicle 100. When light assembly 118 is in the second light position 126, rear frame panel 154 faces inwardly towards roof area 102 and front frame panel 152 faces outwardly towards exterior area 112. Light source 156 emits light 164 that is directed through front frame panel 152 to illuminate an exterior area 112 adjacent to vehicle 100. In the exemplary embodiment, light assembly 118 pivots about slider member 116 between positions 122 and 126, and a range of between approximately 180 degrees to approximately 270 degrees. More specifically, in the exemplary embodiment, light assembly 118 pivots approximately 190 degrees about slider member 116 between positions 122 and 126. Alternatively, light assembly 118 may pivot about slider member 116 at any other range of angles that enables operation of roof rack lighting assembly 110 as described herein.

Furthermore, when both slider member 116 and light assembly 118 are their respective first positions 120 and 122, roof rack lighting assembly 110 is said to be in a stored position such that assembly 110 is substantially flush against rail 108 for a hidden appearance. Similarly, when both slider member 116 and light assembly 118 are their respective second positions 124 and 126, roof rack lighting assembly 110 is said to be in a fully deployed position. Additionally, although shown in FIG. 4, as being in the second light position 126 when slider member 116 is in the second slider position 124, light assembly 118 may also be rotated into the second light position 126 when slider member 116 is in the first slider position 120. Moreover, light assembly 118 can be illuminated in either the first light position 122 or the second light position 126 independent of the position of slider member 116. That is, light assembly 118 is operable to emit light in the first light position 122 when slider member 116 is in the first slider position 120 and when slider member 116 is in the second slider position 124. Similarly, light assembly 118 is operable to emit light in the second light position 126 when slider member 116 is in the first slider position 120 and when slider member 116 is in the second slider position 124.

In one embodiment, operation of roof rack lighting assembly 110 is selectively controlled via a button, a switch, and/or any other suitable control device (not shown) in vehicle 100. For example, vehicle 100 may include a switch that is accessible by a user when the rear lift gate is opened. Alternatively or additionally, roof rack lighting assembly 110 may be selectively controlled by a button on a remote key fob (not shown). Furthermore, a light assembly control device may be located on light assembly itself or on an interior of the vehicle near a tailgate open switch. In any case, the button may control operation of only light assembly 118 such that operation of the button will illuminate light source 156. Alternatively, the button may control operation of one or both of slider member 116 and/or light assembly 118 such that operation of the button causes: 1) slider member 116 to move from first slider position 120 to second slider position 124; 2) light assembly 118 to move from first light position 122 to second light position 126; and/or 3) illumination of light source 156.

Furthermore, automatic operation of roof rack lighting assembly 110 when in the first positions 120 and 122 may correspond to operation of internal lighting of vehicle 100

(for example the dome light). Additionally, any activation of light assembly can be canceled (turned off) based on either vehicle 100 being taken out of Park or vehicle 100 reaching a predefined speed (e.g., 2 mph). Moreover, operation of the lighting can be configured in a settings menu of the vehicle.

Figure 6:
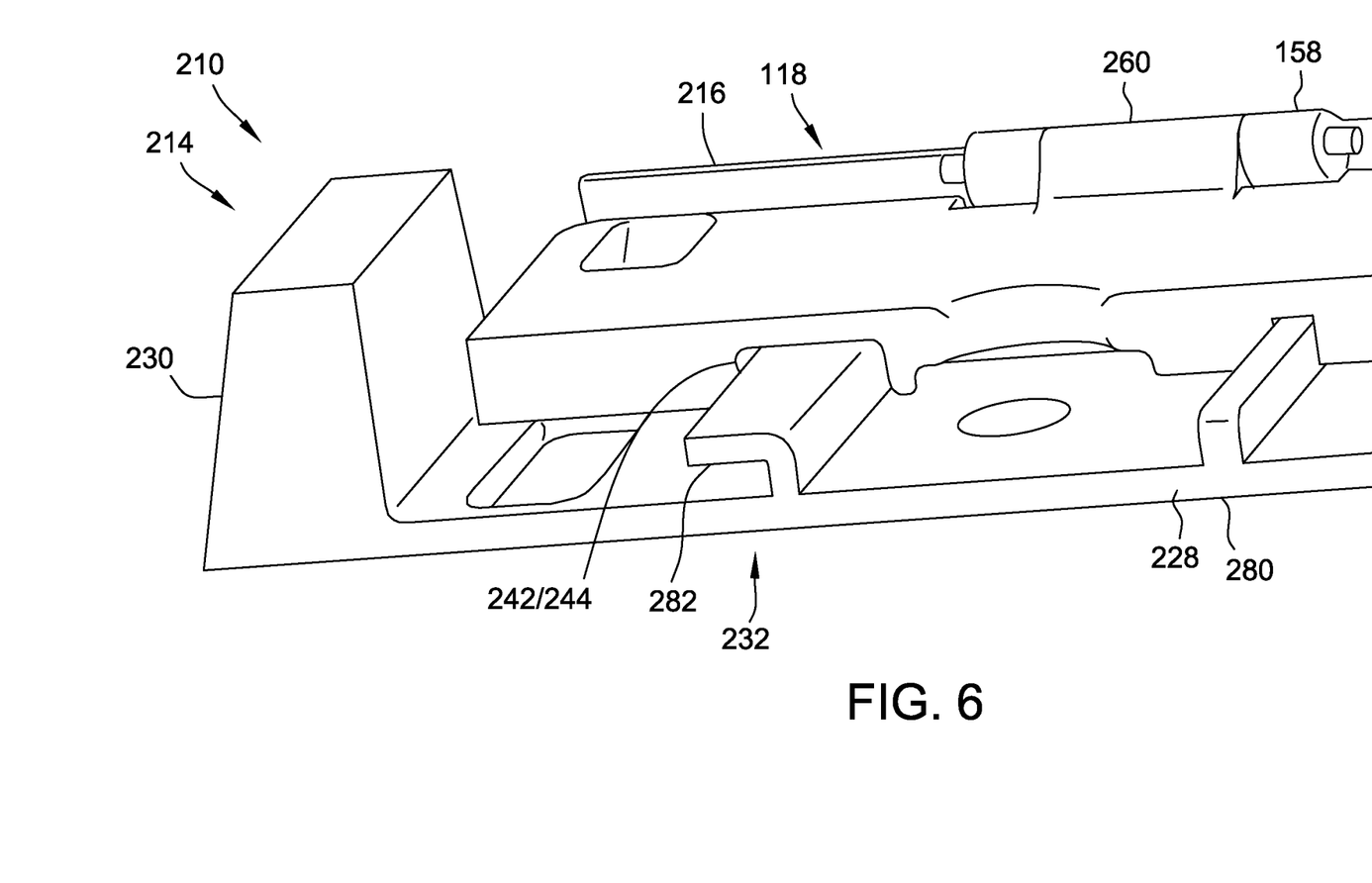
FIG. 6 is an inner perspective view of the roof rack lighting assembly shown in FIG. 5 and including the slider member and light assembly in a second position.

FIGS. 5 and 6 illustrate inner and outer, respectively, perspective views of an alternative embodiment of a roof rack lighting assembly 210 for use with vehicle 100 (shown in FIG. 1). Roof rack lighting assembly 210 is substantially similar to roof rack lighting assembly 110 (shown in FIGS. 1-4) in operation and composition, with the exception that roof rack lighting assembly 210 includes a rail 280 and a clip mechanism 282, rather than pins 138 (shown in FIG. 2). As such, components common to assemblies 110 and 210 shown in FIGS. 5 and 6 are labeled with the same reference numbers as those used in FIGS. 1-4. Components of roof rack lighting assembly 210 shown in FIGS. 5 and 6 that differ from roof rack lighting assembly 110 are labeled with similar reference numbers as those used in FIGS. 1-4 with the exception that the reference numbers are in the 200 series. Roof rack lighting assembly 210 with rail 280 and clip mechanism 282 may be substituted for roof rack lighting assembly 110 with pins 138 for use with vehicle 100.

As shown in FIGS. 5 and 6, roof rack lighting assembly 210 includes a base member 214, a slider member 216, and light assembly 218. Although FIGS. 5 and 6 show slider member 216 and light assembly 218 only in respective second positions 124 and 126, roof rack lighting assembly 210 functions the same way as roof rack lighting assembly 110 and is operable in any of the positions described herein with respect to roof rack lighting assembly 110. Additionally, roof rack lighting assembly 210 is operated either manually or automatically, such as with a control device and may correspond to operation of internal lighting of vehicle 100 in the same way as roof rack lighting assembly 110. Generally, roof rack lighting assembly 210 operates and may be controlled in the same way as described herein with respect to roof rack lighting assembly 110.

Referring to FIG. 6, base member 214 includes a pair of engaging members 232 that enable selective movement and repositioning of slider member 216 with respect to base member 214, as described herein. In one embodiment, each engaging member 232 includes clip mechanism 282.

Similarly, slider member 216 includes a pair of receiving members 242 that cooperate with engaging members 232 of base member 214 to facilitate linear movement of slider member 216 with respect to base member 214. In the embodiment, receiving members 242 include a slot 244 defined therein that is sized to receive clip mechanism 282 therein.

Additionally, base member 216 may include a rail 280 extending from a base wall 228. Rail 280 engages with a groove 284 in a rear surface of slider member 216 to maintain alignment of slider member 216 with base member 214.

Embodiments of the assembly described herein include a roof rack lighting assembly for a vehicle. Such assemblies include a base member that couples to a roof rail of the vehicle. The roof rack lighting assemblies also includes a slider member that is slidably coupled to the base member such that the slider member is selectively linearly moveable between a first slider position and a second slider position. A light assembly is pivotally coupled to the slider member such that the light assembly is moveable between a first light position and a second light position. When in the first light position, the light assembly illuminates the roof area of the vehicle to assist with attaching or removing an item to or from the roof rack. When in the second light position, the light assembly illuminates an exterior area adjacent to the vehicle for additional light during roadside assistance or for other activities, such as camping.

Example technical effects of the methods, systems, and apparatus described herein include at least one of: (a) illuminating the roof area of the vehicle to assist with attaching or removing an item to or from the roof rack; (b) illuminating an exterior area adjacent to the vehicle for additional light during roadside assistance; and (c) illuminating an exterior area adjacent to the vehicle for additional light during leisure activities, such as camping.

The systems and methods described herein are not limited to the specific embodiments described herein, but rather, components of the systems and/or steps of the methods may be utilized independently and separately from other components and/or steps described herein.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

As used herein, an element or step recited in the singular and proceeded with the word "a" or "an" should be understood as not excluding plural elements or steps unless such exclusion is explicitly recited. Furthermore, references to "one embodiment" of the present disclosure or "an example embodiment" are not intended to be interpreted as excluding the existence of additional embodiments that also incorporate the recited features.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A roof rack lighting assembly for a vehicle, said roof rack lighting assembly comprising: a base member fixedly secured to at least one of a pair of roof rails of a roof of the vehicle; a slider member slidably coupled to the base member and selectively moveable in a vertical direction between a first slider position and a second slider position; and a light assembly pivotally coupled to the slider member and selectively rotatable about an axis perpendicular to the vertical direction between a first light position and a second light position.

2. The assembly of claim 1, wherein said light assembly is configured to illuminate a roof area of said vehicle when in the first light position, and wherein said light assembly is configured to illuminate an area adjacent to said vehicle when in the second light position.

3. The assembly of claim 1, wherein said light assembly is operable to emit light in the first light position when said slider member is in the first slider position and when said slider member is in the second slider position.

4. The assembly of claim 1, wherein said light assembly is operable to emit light in the second light position when said slider member is in the first slider position and when said slider member is in the second slider position.

5. The assembly of claim 1, wherein said light assembly comprises a frame and a light source positioned within said frame, said frame being pivotally coupled to said slider member.

6. The assembly of claim 1, wherein said base member comprises a pair of sidewalls and a base wall extending therebetween that defines a cavity.

7. The assembly of claim 6, wherein said slider member is positioned between said pair of sidewalls within said cavity in the first slider position.

8. The assembly of claim 6, wherein said slider member is spaced from the cavity when in the second slider position.

9. The assembly of claim 1, wherein said base member comprises at least one engaging member configured to cooperate with at least one receiving member of said slider member to facilitate movement of said slider member with respect to said base member.

10. A method of operating a roof rack lighting system of a vehicle, said method comprising:
sliding a slider member with respect to a base member in a vertical direction between a first slider position and a second slider position, wherein the base member is coupled to at least one roof rail of a roof of the vehicle;
rotating a light assembly with respect to the slider member about an axis perpendicular to the vertical direction between a first light position and a second light position;
operating a light source of the light assembly to illuminate a roof area of the vehicle when the light assembly is in the first light position;
and operating the light source of the light assembly to illuminate an area adjacent the vehicle when the light assembly is in the second light position.

11. The method of claim 10, wherein operating the light source comprises operating the light source when the light assembly is in the first light position when the slider member is in the first slider position.

12. The method of claim 10, wherein operating the light source comprises operating the light source when the light assembly is in the first light position when the slider member is in the second slider position.

13. The method of claim 10, wherein operating the light source comprises operating the light source when the light assembly is in the second light position when the slider member is in the first slider position.

14. The method of claim 10, wherein operating the light source comprises operating the light source when the light assembly is in the second light position when the slider member is in the second slider position.

15. A vehicle comprising:
a roof comprising a roof panel and a pair of roof rails;
a roof rack lighting assembly comprising:
a base member coupled to at least one of said pair of roof rails;
a slider member slidably coupled to the base member, wherein said slider member is selectively moveable in a vertical direction between a first slider position and a second slider position; and
a light assembly pivotally coupled to the slider member, wherein the light assembly is selectively rotatable about an axis perpendicular to the vertical direction between a first light position and a second light position.

16. The vehicle of claim 15, wherein said light assembly is configured to illuminate a roof area of said vehicle when in the first light position, and wherein said light assembly is configured to illuminate an area adjacent to said vehicle when in the second light position.

17. The vehicle of claim 16, wherein said light assembly is operable to emit light in the first light position when said slider member is in the first slider position and when said slider member is in the second slider position.

18. The vehicle of claim 16, wherein said light assembly is operable to emit light in the second light position when said slider member is in the first slider position and when said slider member is in the second slider position.

19. The vehicle of claim 15, wherein said base member comprises a pair of sidewalls and a base wall extending therebetween that defines a cavity, wherein said slider member is positioned between said pair of sidewalls within said cavity in the first slider position, and wherein said slider member is spaced from the cavity in the second slider position.

20. The vehicle of claim 15, wherein said base member comprises at least one engaging member configured to cooperate with at least one receiving member of said slider member to facilitate movement of said slider member with respect to said base member.

* * * * *